United States Patent
Osaki

(10) Patent No.: US 9,608,253 B2
(45) Date of Patent: Mar. 28, 2017

(54) LEAD-ACID BATTERY TERMINAL MEMBER AND LEAD-ACID BATTERY

(71) Applicant: GS Yuasa International Ltd., Kyoto-shi, Kyoto (JP)

(72) Inventor: Shin Osaki, Kyoto (JP)

(73) Assignee: GS Yuasa International Ltd., Kyoto (JP)

(*) Notice: Subject to any disclaimer, the term of this patent is extended or adjusted under 35 U.S.C. 154(b) by 94 days.

(21) Appl. No.: 14/281,011

(22) Filed: May 19, 2014

(65) Prior Publication Data

US 2014/0363722 A1  Dec. 11, 2014

(30) Foreign Application Priority Data

Jun. 7, 2013 (JP) .................................. 2013-121056

(51) Int. Cl.
*H01M 2/30* (2006.01)
*H01M 2/06* (2006.01)
*H01M 2/08* (2006.01)
*H01M 10/06* (2006.01)

(52) U.S. Cl.
CPC ............ *H01M 2/307* (2013.01); *H01M 2/06* (2013.01); *H01M 2/08* (2013.01); *H01M 10/06* (2013.01); *H01M 2220/20* (2013.01); *Y02E 60/126* (2013.01)

(58) Field of Classification Search
CPC ..................................................... H01M 2/307
See application file for complete search history.

(56) References Cited

U.S. PATENT DOCUMENTS

2007/0275301 A1* 11/2007 Asahina ................. H01M 2/06
429/181
2012/0263997 A1 10/2012 Haruyama et al.

FOREIGN PATENT DOCUMENTS

| JP | 2010-003446 | 1/2010 |
| JP | 2010-118199 | 5/2010 |
| JP | 2011-076929 | 4/2011 |
| JP | 2011-134587 | 7/2011 |
| JP | 2011-228258 | 11/2011 |

OTHER PUBLICATIONS

Miyazawa (JP, 2011-129477) (a raw machine translation) (Abstract, Detailed Description and Drawings) (Jun. 30, 2015).*
JP, 2014-086375 (a raw machine translation) (Abstract) (May 12, 2014).*

* cited by examiner

*Primary Examiner* — Miriam Stagg
*Assistant Examiner* — Carmen Lyles-Irving
(74) *Attorney, Agent, or Firm* — Rankin, Hill & Clark LLP

(57) ABSTRACT

A lead-acid battery terminal member includes: a terminal portion which is arranged in a resin-made cover for closing a container; and a cylindrical bushing which is connected to the terminal portion through a conducting portion. The bushing is embedded in the cover, and has a plurality of annular projecting portions formed on an outer periphery thereof. Poles extending from an electrode group arranged in the container are inserted into and are welded to the bushing. Surface roughness of a surface of the annular projecting portion which faces a resin forming the cover in an opposed manner is lower than surface roughness of a surface of a portion other than the annular projecting portion.

7 Claims, 4 Drawing Sheets

LEAD-ACID BATTERY TERMINAL MEMBER AND LEAD-ACID BATTERY

CROSS-REFERENCE TO RELATED APPLICATION

This application claims the benefit of Japanese patent application No. 2013-121056, filed on Jun. 7, 2013, which is incorporated herein by reference.

FIELD

The present invention relates to a lead-acid battery terminal member and a lead-acid battery provided with such a terminal member.

BACKGROUND

A lead-acid battery disclosed in JP-A-2011-134587 includes a metal-made terminal member which is formed in a resin-made cover for closing a container by insert molding. The terminal member includes: a terminal portion to which an external line is connected; and a cylindrical bushing into which poles extending from an electrode group arranged in the container are inserted and to which the poles are welded.

It is often the case where a space for housing a lead-acid battery mounted on a vehicle or the like is limited to a narrow space. Recently, for enhancing performance of a lead-acid battery in the narrow space or for realizing the further miniaturization of the lead-acid battery, there has been made an attempt to shorten a length of the bushing in the cylinder axis direction in order to increase a rate that constitutional members such as electrode plates occupy in the lead-acid battery. Although the bushing is embedded in a resin material which forms the cover, the shorter the length of the bushing, the shorter a creeping distance of a portion where an outer peripheral surface of the bushing and the cover face each other in an opposed manner becomes so that an electrolyte solution in the container tends to climb up through a minute air gap between the outer peripheral surface of the bushing and the cover and exudes. Further, when the electrolyte solution exudes to a terminal portion, the electrolyte solution spreads over and wets the whole terminal portion thus becoming a cause of a color change or the like.

SUMMARY

The following presents a simplified summary of the invention disclosed herein in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

It is an object of the present invention to effectively suppress the exuding of an electrolyte solution through a minute air gap between a bushing embedded in a cover provided with a lead-acid battery terminal member and the cover.

According to an aspect of the present invention, there is provided a lead-acid battery terminal member including: a terminal portion which is arranged in a resin-made cover for closing a container, and a cylindrical bushing which is connected to the terminal portion, is embedded in the cover and has a plurality of annular projecting portions formed on an outer periphery thereof, and into which poles extending from an electrode group arranged in the container are inserted and to which the poles are welded, wherein surface roughness of at least a portion of the outer periphery of the bushing which faces a resin which forms the cover is lower than surface roughness of the terminal portion. The surface roughness expresses the degree of roughness of a surface, and the lower the surface roughness, the smoother the surface is.

BRIEF DESCRIPTION OF THE DRAWINGS

The foregoing and other features of the invention will become apparent to one skilled in the art to which the present invention relates upon consideration of the invention with reference to the accompanying drawings, wherein.

DESCRIPTION OF EMBODIMENTS

Figures 1, 2:
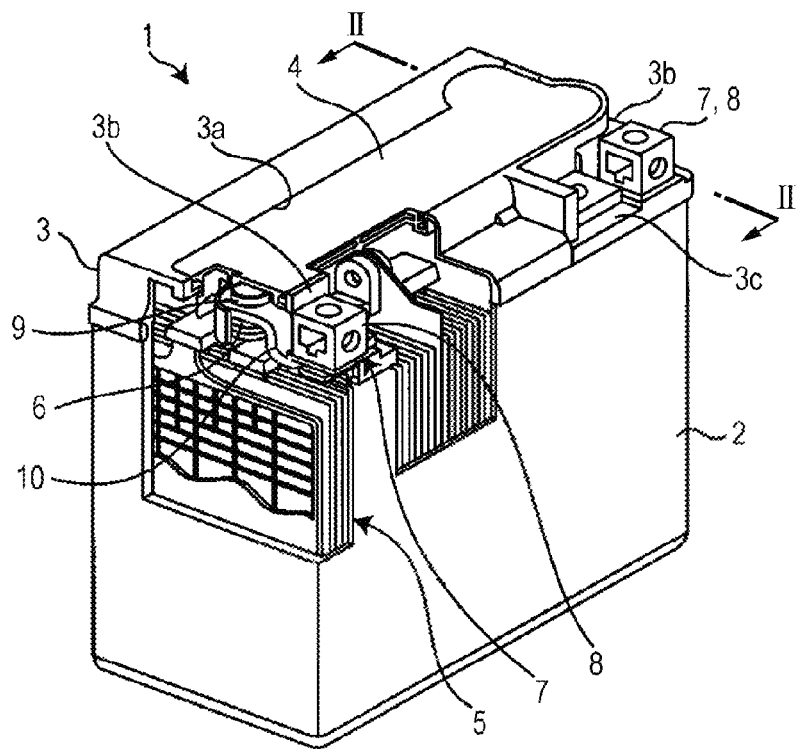
FIG. 1 is a perspective view with a part broken away showing a lead-acid battery according to an embodiment of the present invention.
FIG. 2 is a cross-sectional view taken along line II-II in FIG. 1.

According to a first aspect of the present invention, there is provided a lead-acid battery terminal member including: a terminal portion which is arranged in a resin-made cover for closing a container, and a cylindrical bushing which is connected to the terminal portion, is embedded in the cover, and has a plurality of annular projecting portions formed on an outer periphery thereof, and into which poles extending from an electrode group arranged in the container are inserted and to which the poles are welded, wherein surface roughness of at least a portion of the outer periphery of the bushing which faces a resin which forms the cover is lower than surface roughness of the terminal portion. The surface roughness expresses the degree of roughness of a surface, and the lower the surface roughness, the smoother the surface is.

According to the first aspect of the present invention, by making the surface roughness of at least a portion out of the bushing lower than surface roughness of the terminal portion in the terminal member, a minute gap formed between the surface of the portion of the bushing where surface roughness is low and a resin material which forms the cover can be narrowed by a certain distance and hence, it is extremely difficult for an electrolyte solution to pass through the gap compared to other portions. As a result, it is possible to effectively suppress the climbing up and exuding of the electrolyte solution in the container. Further, since the surface of the terminal portion has high surface roughness, the surface of the terminal portion exhibits high water repellency compared to the case where the surface roughness is low. Accordingly, at a boundary immediately before the electrolyte solution exudes to the terminal portion after passing the above-mentioned gap, it is possible to stop the flow of the electrolyte solution and hence, it is possible to more effectively suppress the climbing up and exuding of the electrolyte solution in the container. Further, even when the electrolyte solution exudes, the electrolyte solution tends to remain in a portion where the electrolyte solution exudes and hence, it is possible to prevent the electrolyte solution from spreading over and wetting the whole terminal portion.

According to a second aspect of the present invention, there is provided a lead-acid battery terminal member further including a conducting portion which joins the terminal portion and the bushing.

According to the second aspect of the present invention, by increasing a creeping distance along which the electrolyte solution climbs up, it is possible to remarkably suppress the exuding of the electrolyte solution in the container.

According to a third aspect of the present invention, there is provided a lead-acid battery terminal member in which the surface roughness of the whole bushing which faces a resin forming the cover in an opposed manner is lower than the surface roughness of the terminal portion.

According to the third aspect of the present invention, a distance of a narrow gap formed between the surface of the portion of the bushing where the surface roughness is low and the resin material forming the cover can be increased and hence, it is possible to more effectively suppress the exuding of the electrolyte solution in the container.

Embodiments of the present invention will be described hereinafter.

FIG. 1 shows a control-valve-type lead-acid battery 1 according to an embodiment of the present invention (a lead-acid battery for a motorcycle in this embodiment).

The control-valve-type lead-acid battery 1 includes a rectangular parallelepiped container 2 with an upper end thereof opened; a cover 3 which closes an opening of the container 2; and an auxiliary cover 4 which closes an upper-end opening 3a of the cover 3. The container 2, the cover 3 and the auxiliary cover 4 are made of a resin material such as a thermoplastic synthetic resin, for example, polypropylene, polyethylene or polyethylene-polypropylene copolymer. An electrolyte solution containing a diluted sulfuric acid is stored in the container 2. An electrode group 5 is also housed in the container 2. The electrode group 5 is constituted of a plurality of positive plates and a plurality of negative plates which are alternately stacked with a separator interposed between each two neighboring plates. A positive pole 6 and a negative pole 6 project toward the cover 3 from an upper end side of the electrode group 5.

The cover 3 has an approximately rectangular shape in the plan view, and recessed portions or a notched portions 3b are formed on both end portions of one long side of the cover 3 (the long side on a right side in FIG. 1) respectively. A terminal portion 8 of a terminal member 7 described later is arranged at each notched portion 3b.

To explain this embodiment also with reference to FIG. 2, in this embodiment, a pair of terminal members 7 (lead-acid battery terminal members) made of lead or a lead alloy is mounted on the cover 3. The terminal members 7 are mounted on the cover 3 by insert molding (integral molding), and the most of the terminal members 7 are embedded in the resin material which forms the cover 3.

Each of the terminal members 7 includes: a terminal portion 8 to which an external lead line (not shown) is connected; a bushing 9 to which the pole 6 is connected by welding; and a conducting portion 10 which joins and electrically connects the terminal portion 8 and the bushing 9 to each other. The terminal member 7 is manufactured by casting. The terminal portion 8, the bushing 9, and the conducting portion 10 are formed as an integral structure.

As described above, the terminal portion 8 of the terminal member 7 which is arranged in the notched portion 3b of the cover 3 has a lower portion 8a thereof embedded in a top plate 3c of the cover 3. An upper portion of the terminal portion 8 has a hollow parallelepiped structure which is constituted by four side walls 8b in each of which a through hole is formed; and a top wall 8c in which a through hole is formed in the same manner as the side walls 8b. By accommodating a nut (not shown) in the side walls 8b and the top wall 8c, a terminal (not shown) of the external lead line can be connected to the terminal portion 8 using a bolt.

The bushing 9 of the terminal member 7 has a through hole 9a extending in the vertical direction for allowing the insertion of the pole 6 therein. The bushing 9 exhibits a both-end opened cylindrical shape extending in the vertical direction as a whole. A plurality of (three in this embodiment) annular projecting portions 9b which are circular rings having an elliptical cross section are formed on a lower end side of an outer peripheral surface of the bushing 9 at intervals in the vertical direction. The bushing 9 is embedded in the top plate portion 3c of the cover 3 except for an upper end portion thereof. Particularly, all annular projecting portions 9b are embedded in a resin material forming the cover 3.

In this embodiment, the conducting portion 10 of the terminal member 7 exhibits a bent strip shape where a width and a thickness of the conducting portion 10 are substantially set to fixed values. To be more specific, the conducting portion 10 includes a first portion 10a which has one end thereof connected to an upper end side of the bushing 9 and extends substantially in the horizontal direction. The conducting portion 10 also includes a second portion 10b which extends downward from the other end of the first portion 10a in a bending manner. An end portion of the second portion 10b (an end portion on a side opposite to the first portion 10a) is connected to a lower end side of the terminal portion 8. The whole conducting portion 10 is embedded in the resin material which forms the cover 3.

As described above, the terminal member 7 is manufactured by casting using lead or a lead alloy. To enhance mold removing property at the time of taking out the cast terminal member 7 from a mold, a lubricant formed of a mass of fine particles is applied to a casting surface of the mold. On the other hand, by applying the lubricant to the casting surface of the mold, an uneven shape which traces the fine particles of the lubricant is formed on a surface of the terminal member 7 after being removed from the mold. By making the fine particles of the lubricant coarse, the surface roughness of the surface of the terminal member 7 is increased. In the case where the surface roughness of the cast terminal member 7 is low, when the terminal member 7 is formed in the resin-made cover 3 by insert molding, a minute air gap between the surface of the terminal member 7 and the resin material is increased. Particularly, when the gap between the outer peripheral surface of the bushing 9 and the resin material, is large, an electrolyte solution in the container 2 tends to easily exude through the minute air gap formed between the bushing 9 and the resin material. The exuded electrolyte solution reaches the terminal portion 8 along the conducting portion 10, and causes a color change or the like of the terminal portion 8.

In the terminal member 7 of this embodiment, a lubricant is not applied to portions of a mold for casting a corresponding region where the annular projecting portions 9b are formed on the outer peripheral surface of the bushing 9 indicated by symbol F in FIG. 2. On the other hand, a lubricant is applied to portions of the mold for casting the terminal member 7 corresponding to a region of the outer peripheral surface of the bushing 9 other than the region where the annular projecting portions 9b are formed. In the region F where the lubricant is not used, the surface roughness of the surface of the terminal member 7 is low compared to other portions where the lubricant is used. On the other hand, the lubricant is used in the portions other than the region F and hence, the mold removing property of removing the cast terminal member 7 from the mold is ensured.

Figure 3:
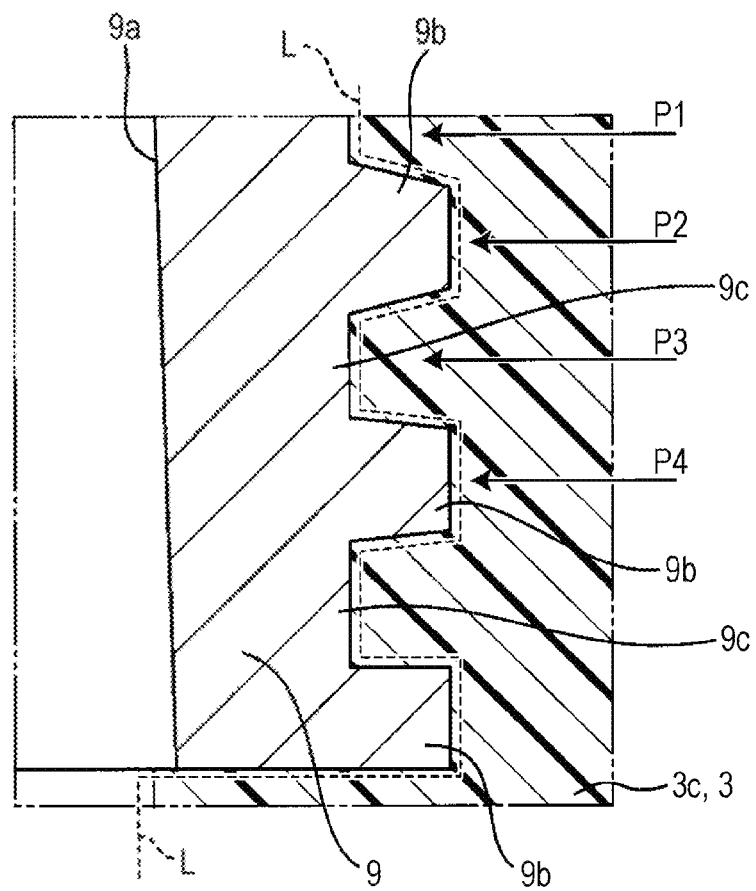
FIG. 3 is a partially enlarged view in FIG. 2.
Figure 4A:
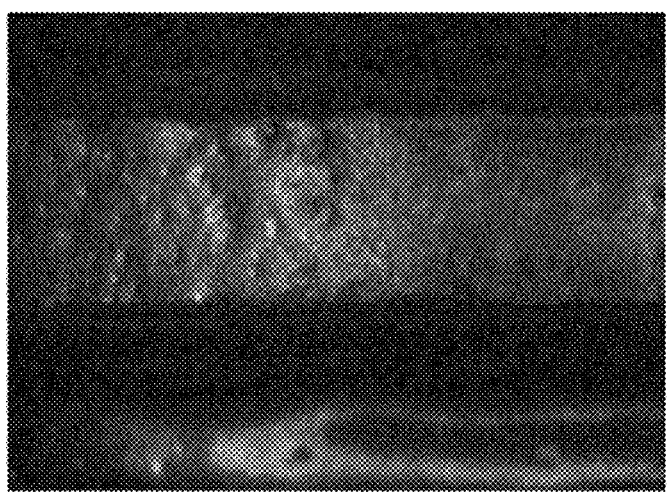
FIG. 4A is a photomicrograph of the lead-acid battery at a measuring position P1 in FIG. 3.
Figure 4B:
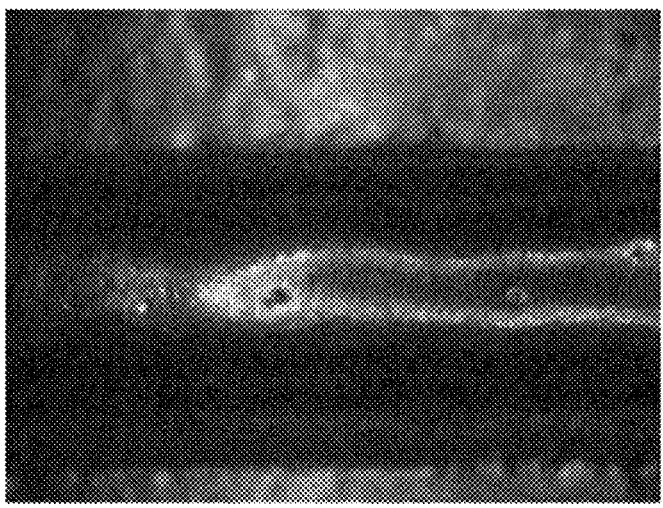
FIG. 4B is a photomicrograph of the lead-acid battery at a measuring position P2 in FIG. 3.
Figure 4C:
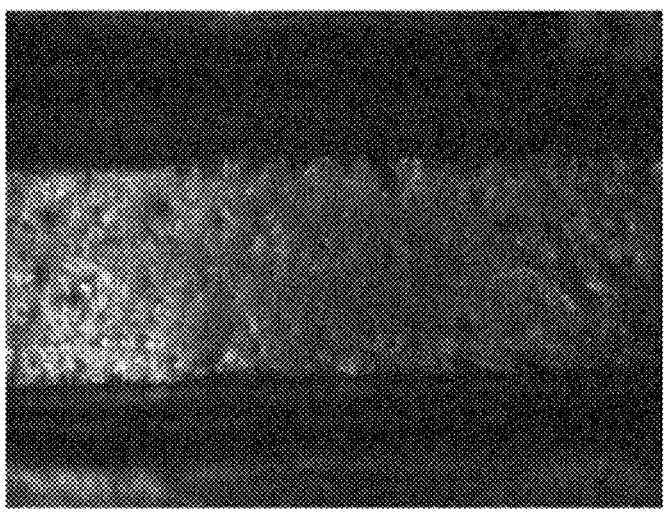
FIG. 4C is a photomicrograph of the lead-acid battery at a measuring position P3 in FIG. 3.
Figure 4D:
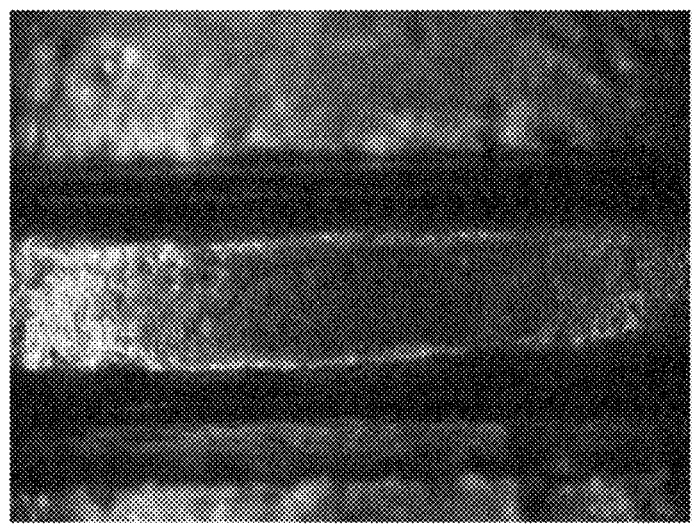
FIG. 4D is a photomicrograph of the lead-acid battery at a measuring position P4 in FIG. 3.
Figure 4E:
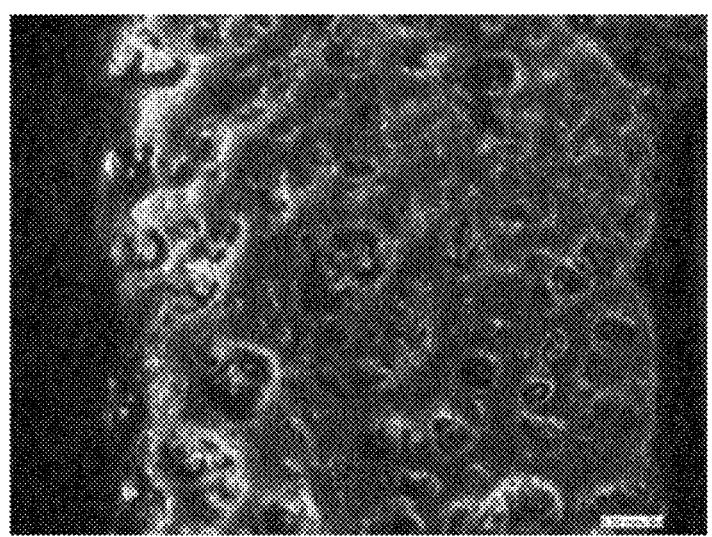
FIG. 4E is a photomicrograph of the lead-acid battery at a measuring position P5 in FIG. 2.

As conceptually shown in FIG. 3 by a broken line L, due to the provision of the plurality of annular projecting portions 9b, an interface between the outer peripheral surface of the bushing 9 and a resin material which forms the cover 3, that is, a creeping path through which the electrolyte solution in the container 2 exudes exhibits a kind of labyrinth shape. Further, in this embodiment, since a lubricant is not used in the region F, the surface roughness of the outer peripheral surface of the bushing 9 is lowered compared to the surface roughness of the terminal portion 8. A gap formed between the outer peripheral surface of the bushing 9 and the resin material which forms the cover 3 is set extremely narrow, and a creeping distance is elongated. As a result, it is possible to effectively suppress climbing up and exuding of the electrolyte solution through the path indicated by the broken line L. Further, since the surface of the terminal portion 8 has high surface roughness, the surface of the terminal portion 8 exhibits high water repellency compared to the case where the surface roughness is low. Accordingly, at a boundary immediately before the electrolyte solution exudes to the terminal portion 8 after passing the above-mentioned gap, it is possible to stop the flow of the electrolyte solution and hence, it is possible to more effectively suppress the climbing up and exuding of the electrolyte solution in the container 2. Further, even when the electrolyte solution exudes, the electrolyte solution tends to remain in a portion (proximal end portion of the terminal portion 8) where the electrolyte solution exudes and hence, it is possible to prevent the electrolyte solution from spreading over and wetting the whole terminal portion 8.

Measuring positions P1 to P4 shown in FIG. 3 and a measuring position P5 shown in FIG. 2 were photographed using a ultra depth surface shape measuring microscope (laser microscope: VK-8500 made by Keyence Corporation). Images measured at the measuring positions P1 to P5 are shown in FIG. 4A to FIG. 4E respectively. A ten-point average roughness Rz per square mm was measured at the measuring positions P1, P5 (in accordance with JIS B 0601-1994). A result of measurement is shown in the following Table 1 and Table 2.
(Measuring Position P1)

TABLE 1

| Length X (µm) | 1000.000 |
|---|---|
| Length Y (µm) | 1000.000 |
| Area (µm²) | 1000000.000 |
| Rz (µm) | 421.883 |

(Measuring Position P5)

TABLE 2

| Length X (µm) | 1000.000 |
|---|---|
| Length Y (µm) | 1000.000 |

TABLE 2-continued

| Area (µm²) | 1000000.000 |
|---|---|
| Rz (µm) | 653.854 |

The measuring position P5 is a portion where a lubricant is used, and the measuring positions P1 to P4 are portions (regions F) where the lubricant is not used. As can be clearly understood by a comparison between FIG. 4E which shows the image at the measuring position P5 and FIG. 4A to FIG. 4D which show the images at the measuring positions P1 to P4, at a portion of the outer peripheral surface of the bushing 9 where the annular projecting portions 9b are formed, since the lubricant is not used, the unevenness is extremely small so that the portion is smooth. Further, as can be clearly understood from Table 1 and Table 2, at the portion of the outer peripheral surface of the bushing 9 where the annular projecting portions 9b are formed and the lubricant is not used (region F), a value of ten-point average roughness Rz is small compared to a ten-point average roughness Rz at the portion other than the region F where the lubricant is used. That is, the surface of the terminal member 7 in the portion of the outer peripheral surface of the bushing 9 where the annular projecting portions 9b are formed and the lubricant is not used (region F) exhibits the lower surface roughness compared to the surface of the terminal member 7 other than the region F where the lubricant is used.

A method for setting the surface roughness of the portion of the outer peripheral surface of the bushing 9 where the annular projecting portions 9b are formed (region F) lower than the surface roughness of the portion other than the region F is not limited to the technique of this embodiment. For example, it may be possible to adopt a technique that the lubricant is used over the whole surface of the terminal member 7 at the time of casting, and the surface roughness of the region F may be set lower than the surface roughness of other portions by applying chemical treatment such as etching after casting or by applying physical treatment such as striking. Further, it may be also possible to adopt a technique that the whole terminal member 7 is manufactured by forging, and a striking pressure is adjusted thus setting the surface roughness of the region F lower than other portions.

In this embodiment, the terminal portion 8 and the bushing 9 are joined and electrically connected with each other through the conducting portion 10, However, the terminal portion 8 may be directly connected to an upper end of the bushing 9, for example.

Further, in this embodiment, the plurality of annular projecting portions 9b are arranged in a spaced-apart manner in the cylinder axis direction of the bushing 9, However, the plurality of annular projecting portions 9b may be formed such that a start point and an end point of each annular projecting portion 9b are displaced from each other in the cylinder axis direction, and the start point of one of annular projecting portions 9b arranged adjacent to each other is connected to the end point of the other annular projecting portion 9b.

In addition, according to this embodiment, the surface roughness of the whole of the plurality of annular projecting portions 9b is set lower than the surface roughness of the terminal portion 8. However, the portion where the surface roughness is low may be at least a portion of the bushing 9. For example, only the surface roughness of the annular projecting portion 9b on a most container 2 side (proximal end side) may be set lower than the surface roughness of the terminal portion 8, and the surface roughness of other annular projecting portions 9b may be set equal to the surface roughness of the terminal portion 8. In this case, a gap formed between the bushing 9 and the cover 3 can be set extremely narrow and hence, the intrusion of the electrolyte solution in the container 2 can be suppressed whereby it is possible to suppress the climbing up and exuding of the electrolyte solution.

Further, in this embodiment, the surface roughness of the whole of the plurality of annular projecting portions 9b is set uniform. However, the surface roughness of the annular projecting portion 9b and the surface roughness of the recessed portion 9c formed between the annular projecting portions 9b arranged adjacent to each other may differ from each other alternately To be more specific, for example, the surface roughness of the annular projecting portion 9b may be set lower than the surface roughness of the recessed portion 9. Such difference in surface roughness can be adjusted by changing a pressure at the time of striking after the terminal member 7 is manufactured by casting.

Accordingly, it is possible to suppress the exuding of the electrolyte solution through the narrow gap formed between the surface of the annular projecting portion 9b of the bushing 9 and the resin material which forms the cover 3. Further, with the use of the recessed portion 9c of the bushing 9 and the resin material which forms the cover 3, opposedly facing areas can be increased thus enhancing air tightness. Further, by alternately arranging the annular projecting portion 9c having the low surface roughness and the recessed portion 9 having the high surface roughness in the bushing 9, the exuding of the electrolyte solution can be suppressed constantly thus enhancing air tightness irrespective of a climbing up state of the electrolyte solution between the bushing 9 and the cover 3.

What is claimed is:

1. A lead-acid battery terminal member comprising:
a terminal portion which is arranged in a resin-made cover for closing a container; and
a cylindrical bushing which is connected to the terminal portion, is embedded in the cover, and has a plurality of annular projecting portions formed on an outer periphery thereof, and into which poles extending from an electrode group arranged in the container are inserted and to which the poles are welded, wherein
surface roughness of at least a portion of the outer periphery of the bushing which faces a resin which forms the cover is lower than surface roughness of the terminal portion.

2. The lead-acid battery terminal member according to claim 1 further comprising a conducting portion which joins the terminal portion and the bushing.

3. The lead-acid battery terminal member according to claim 2, wherein the surface roughness of the whole bushing which faces a resin forming the cover in an opposed manner is lower than the surface roughness of the terminal portion.

4. A lead-acid battery which includes the lead-acid battery terminal member according to claim 1.

5. The lead-acid battery terminal member according to claim 1, wherein the cylindrical bushing comprises recessed portions formed between the annular projecting portions arranged adjacent to each other, and
the surface roughness of the annular projecting portions is lower than the surface roughness of the recessed portions.

6. A lead-acid battery terminal member comprising:
a terminal portion which is arranged in a resin-made cover for closing a container; and
a cylindrical bushing which is connected to the terminal portion, is embedded in the cover, and has a plurality of annular projecting portions formed on an outer periphery thereof, and into which poles extending from an electrode group arranged in the container are inserted and to which the poles are welded, wherein
surface roughness of the terminal portion is higher than surface roughness of at least a portion of the outer periphery of the bushing which faces a resin which forms the cover.

7. A lead-acid battery terminal member comprising:
a terminal portion which is arranged in a resin-made cover for closing a container; and
a cylindrical bushing which is connected to the terminal portion, is embedded in the cover, and has a plurality of annular projecting portions formed on an outer periphery thereof, and into which poles extending from an electrode group arranged in the container are inserted and to which the poles are welded, wherein
surface roughness of at least a portion of the outer periphery of the bushing which faces a resin which forms the cover is lower than surface roughness of the terminal portion, and
the surface of the terminal portion has high surface roughness such that the surface of the terminal portion suppresses climbing up of an electrolyte solution on the surface of the terminal portion.

* * * * *